S. C. STINER & R. H. KEHRING.
APPARATUS FOR THE MANUFACTURE OF TIN OR LIKE PLATES.
APPLICATION FILED APR. 22, 1909.

930,501. Patented Aug. 10, 1909.
3 SHEETS—SHEET 1.

WITNESSES.
INVENTORS

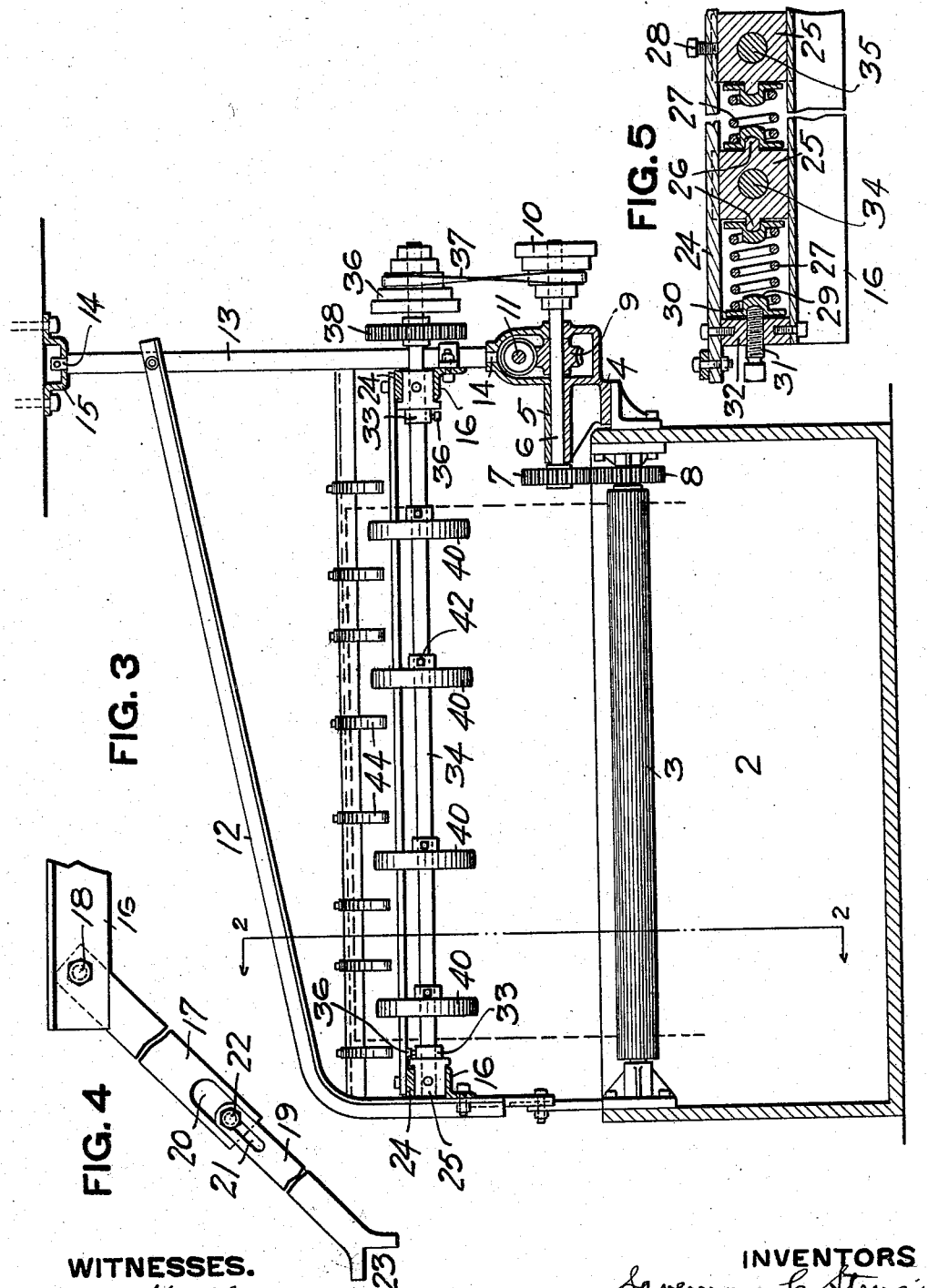

S. C. STINER & R. H. KEHRING.
APPARATUS FOR THE MANUFACTURE OF TIN OR LIKE PLATES.
APPLICATION FILED APR. 22, 1909.

930,501.

Patented Aug. 10, 1909.

3 SHEETS—SHEET 3.

WITNESSES.
INVENTORS

UNITED STATES PATENT OFFICE.

SAVENIOUS C. STINER AND ROBERT H. KEHRING, OF McKEESPORT, PENNSYLVANIA.

APPARATUS FOR THE MANUFACTURE OF TIN OR LIKE PLATES.

No. 930,501.      Specification of Letters Patent.      Patented Aug. 10, 1909.

Application filed April 22, 1909. Serial No. 491,651.    REISSUED

*To all whom it may concern:*

Be it known that we, SAVENIOUS C. STINER and ROBERT H. KEHRING, residents of McKeesport, in the county of Allegheny and State of Pennsylvania, have invented a new and useful Improvement in Apparatus for Use in the Manufacture of Tin or Like Plates; and we do hereby declare the following to be a full, clear, and exact description thereof.

Our invention relates to apparatus for use in connection with the manufacture of tin or like coated plates.

One of the objects of our invention is to provide for the use of solid disks in connection with the catching of the plates as they come from the tin-pot or the feeding of the same to the cleaning apparatus, whereby a much stronger and more durable construction is provided and at the same time one which will not mark the plates.

A further object of our invention is to provide for the quick and convenient removal of the apparatus when it is desired to adjust the rolls in the tinning pot, or for any other purpose.

To these ends our invention comprises the novel features hereinafter set forth and claimed.

Figure 1:
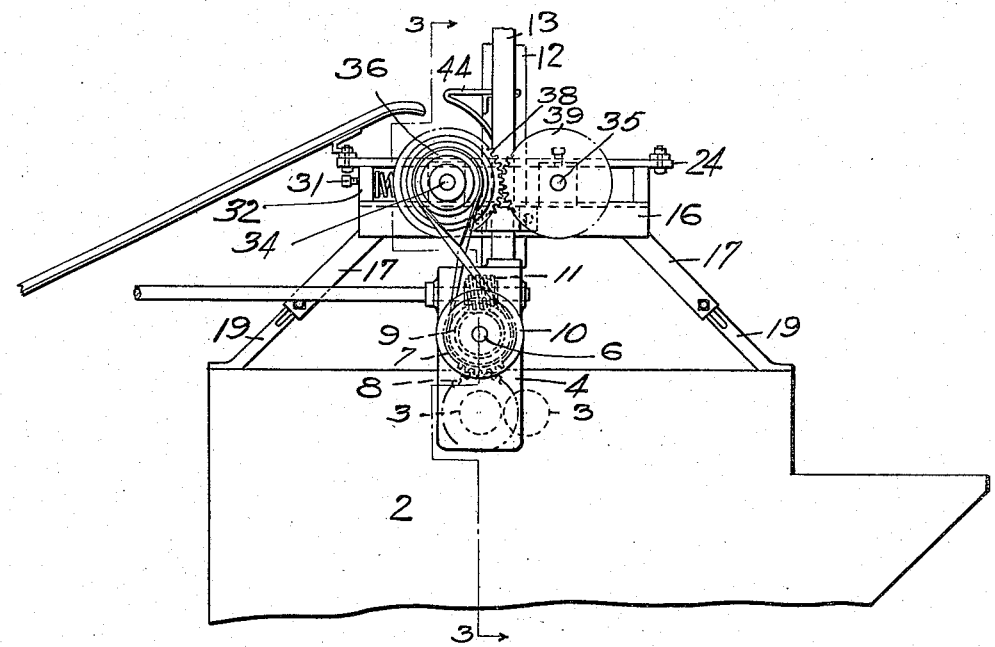
Figure 2:
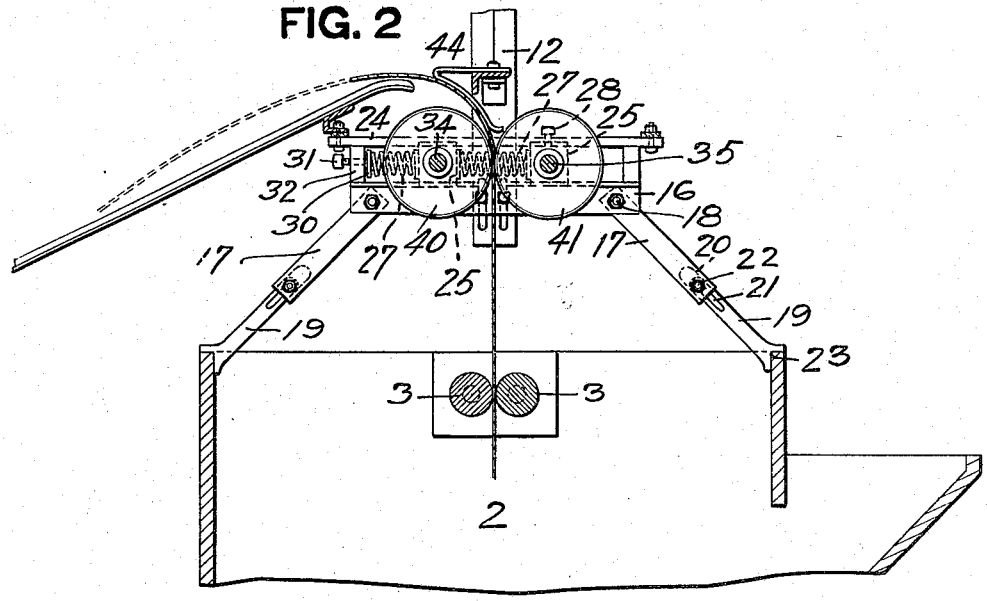
Figure 8:
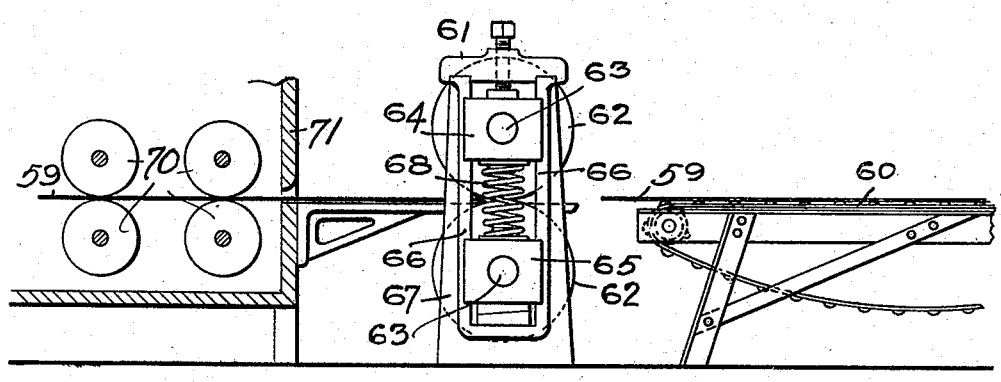
Figure 6:
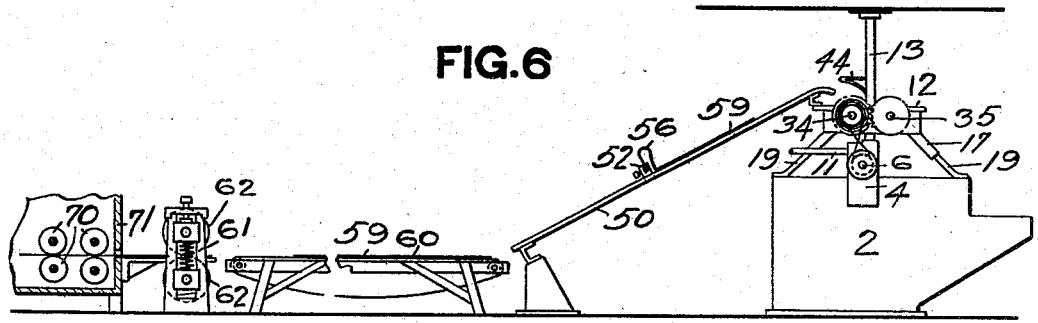
Figure 7:
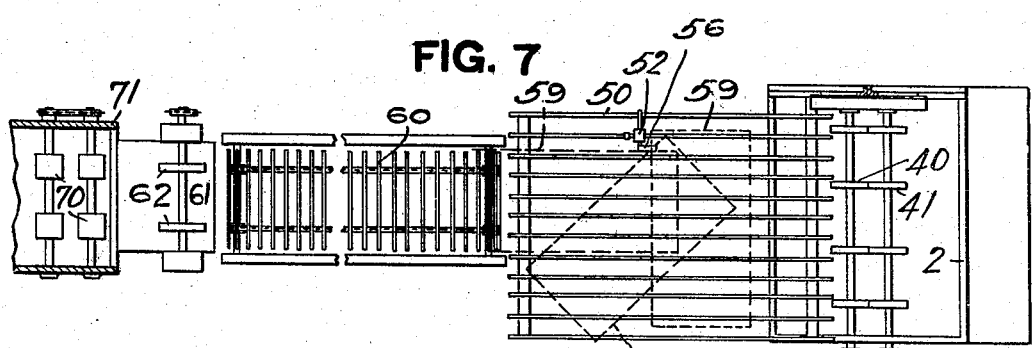
Figure 9:
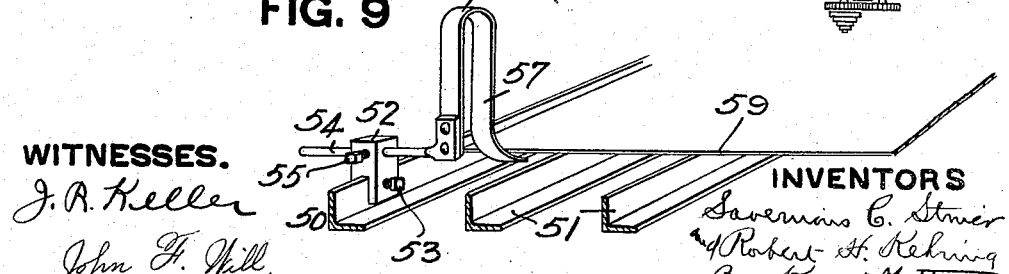

In the drawings Figure 1 is a side elevation of our improved catcher, Fig. 2 is a cross-section on the line 2—2, Fig. 3; Fig. 3 is a section on the line 3—3, Fig. 1; Figs. 4 and 5 are enlarged details of the adjustable legs and bearing boxes; Fig. 6 is a side view of the apparatus; Fig. 7 is a plan view of the same; Fig. 8 is an enlarged view of the apparatus for feeding to the cleaning device; and Fig. 9 is a detail of the shifting apparatus.

In the drawings the numeral 2 designates a tin-pot of any suitable construction which it has not been deemed necessary to illustrate in detail. At the upper end of the tin-pot are mounted the rolls 3 for feeding the plates from the pot. Secured to the tin-pot 2 is the bracket 4 which has the bearing 5 to receive the shaft 6. At the inner end of the shaft 6 is the gear-wheel 7 which meshes with the gear-wheel 8 on one of the tinning rolls 3. On the shaft 6 is the worm-wheel 9 and at the outer end of said shaft is the cone or graduated pulley 10. Mounted in suitable bearings in the bracket 4 is the worm-shaft 11 which meshes with the worm-wheel 9. This worm-shaft 11 is driven from any suitable source of power.

The catcher-frame 12 may be made up of suitable angle bars and bracing rods connected together to form a strong rigid frame, said frame having the mast or column 13 which is provided at its upper and lower ends with the journals 14, the upper journal engaging the seat in the bracket 15 and the lower journal engaging a seat in the bracket 4. The mast or column 13 is free to rotate on its bearings and the frame 12 is thus adapted to swing in a horizontal plane. Secured to the outer cross-bar 16 of the frame 12 are the bars 17, said bars being adjustably secured to the cross bars 16 by means of the bolts 18. These bars 17 project at an angle from the frame and supported by said bars are the legs 19 which are adapted to engage the edges of the tin-pot 2. To provide for the adjustability of the legs 19 on the bars 17, said bars 17 are provided with the grooves or recesses 20 to receive the inner ends of the legs 19. The legs 19 are provided with the slots 21 and bolts 22 pass through said slots and through openings in the bars 17 to secure the legs 19 rigidly in place when once adjusted. The lower ends of the legs 19 are forked, as at 23, so as to fit over the angular upper edge of the tin-pot, said legs when in engagement with the edges of the pot and secured by the bolts 22 hold the frame 12 securely in place against lateral movement and at the same time act as a support for said frame.

The end cross bars 16 of the frame 12, together with the upper cross-bars 24 form the guides and supports for the movable bearing boxes 25. These bearing boxes 25 are provided with the studs 26 and coiled springs 27 are interposed between said bearing boxes, said springs engaging the studs 26. One of the bearing-boxes 25 is secured rigidly in position within the guides by means of the set screws 28. The other bearing-box is adapted to move in the guides when the pressure of the springs is overcome, and to provide for increasing or decreasing the tension of said springs one of said springs engages a stud 29 on the movable washer 30. A set-screw 31 passes through the end piece 32 of the frame and by means of said set screw the tension of the springs may be increased or diminished and the movable bearing-box may be adjusted so as to change its position with reference to the stationary bearing-box, as may be desired. The bearing-boxes 25 are held in position within the guides by means of the collars 33 secured to the shafts 34 and 35 by means of the setscrews 36. The shafts 34 and 35 are journaled in the bearing-boxes 25. The shaft 34 has the cone-pulley 36 which is connected up with the cone pulley 10 by means of the belt 37. A gear-wheel 38 on the shaft 34 meshes with the gear-wheel 39 on the shaft 35.

Mounted on the shafts 34 and 35 are the disks 40 and 41. These disks may be formed of cast steel and are solid in the sense that the rim or periphery is rigidly formed with the hub whether spokes are employed connecting the hub with the rim or whether the wheel, as illustrated, is formed without spokes. These disks are secured to the shafts 34 and 35 by means of set-screws 42 and the disks 41, being mounted upon the shaft 35, are adapted to yield under pressure due to the shaft 35 being mounted in the movable spring actuated bearing boxes 25. These disks, being solid, are very strong and durable and at the same time by being mounted in the yielding bearings they yield properly when in use, as will more fully hereinafter appear. The peripheries of the disks are slightly rounded to reduce the points of contact with the plates. Above the disks is the guide 44 which is adapted to direct the plates as they are drawn up by the disks onto a suitable conveyer by means of which they are carried off.

When our improved apparatus is in use as a catcher for tin-pots the worm-shaft 11 is driven by the engine or motor and power is transmitted therefrom to drive the rolls 3 as well as the shafts 34 and 35 by means of the connections described. The belt 37 is connected up with the cone-pulley 10 and 36 so as to give the proper speed to the disks 40 and 41 to correspond with the travel of the rolls 3. It is apparent that the disks 40 must be arranged to rotate at such a speed as will feed the plates at the same rate of speed as they emerge from the rolls 3. In other words the plates must not be dragged at a greater rate of speed by the disks 40 nor must they be retarded in their travel. This uniformity of speed is readily effected by means of the cone-pulleys. The plates, as they are fed up by the rolls 3 are caught by the disks and carried up thereby. One set of the disks being mounted on a yielding shaft the said disks will yield as may be necessary to prevent too great pressure on the plates, while at the same time they will bear against the plates with sufficient friction to catch and deliver the plates. By the employment of the yielding shaft with the solid disks we obtain a much stronger construction and the disks, being made solid, will not get out of order and their life is greatly increased, while the marking of the plates is practically eliminated. If it is necessary to change the rolls 3 and to insert ones of smaller or larger diameter the cone-pulleys provide for the graduating of the speed of the shafts carrying the disks so as to have them travel at the proper rate of speed to catch the plates and withdraw them from the rolls 3 to obtain the desired feed. When it is necessary to change the rolls 3, or for any other purpose it is desired to get access to the tin-pot, the frame 12 may be swung out of the way and in order to do this it is necessary to loosen the bolts 22 so as to allow the legs 19 to be freed from engagement with the edges of the tin-pot, whereupon the frame 12 may be readily swung to one side so as to give free access to the tin-pot.

Our invention is also applicable for use in connection with a feeder for feeding the plates to the cleaning apparatus and this is illustrated in Figs. 6, 7, 8 and 9. In Fig. 6 there is a general view showing the connection between the tinning pot and the feeding device, and in connection with this apparatus is a device for shifting the plates as they come from the tinning pot so as to be fed properly to the cleaning device. This comprises the inclined skid frame 50 made up of suitable angle bars 51. Secured to one of the angle bars 51 is the block 52 held in place by the set-screw 53. This block supports the arm 54 secured in place by the set-screw 55 and said arm carries the shifter 56. This shifter consists of a U-shaped piece of metal, its arm 57 being free and when made of metal of proper resiliency yields slightly under pressure. This shifter 56 is located in such position that the plate 59 coming from the tin-pot broadwise and sliding down the skidway 50, one corner of the plate will come in contact with the free arm of the shifter and said arm will act to shift the plate so as to bring it around lengthwise to pass in this position onto the conveyer 60. The lower end of the arm 57 of the shifter is slightly curved so as to insure the plate striking said arm to shift it. The plate having been shifted in this way and deposited on the conveyer 60 is carried to the feed mechanism 61. This feed mechanism comprises the disks 62 similar to those used in connection with the catcher for the tin-pot, said disks being mounted on the shafts 63 which are supported in the bearing boxes 64 and 65. These bearing boxes are arranged in guides 66 in the housings 67, and interposed between said bearing boxes are the springs 68 which make one set of the disks 62 yield under pressure when the plate passes between said disks in the same manner as in connection with the tin-pot. The plate is carried by the disks 62 and fed to the rollers 70 of the cleaning device 71. This cleaning device may be of the ordinary character in which the rolls 70 rotate in a bed of saw-dust or bran.

What we claim is:

1. In apparatus for the manufacture of tin or like coated plates, the combination with the tin-pot and rolls, of a horizontally movable frame and rotary disks carried thereby.

2. In apparatus for the manufacture of tin or like coated plates, the combination with the tin-pot and rolls, of a horizontally swinging frame and rotary disks carried thereby.

3. In apparatus for the manufacture of tin or like coated plates, the combination with the tin-pot and rolls, of a rotary vertical mast, a frame carried thereby, and rotary disks carried by said frame.

4. In apparatus for the manufacture of tin or like coated plates, the combination with the tin-pot and rolls, of a horizontally swinging frame, disks carried thereby, and legs on said frame adapted to engage the tin-pot.

5. In apparatus for the manufacture of tin or like coated plates, the combination with the tin-pot and rolls, of a horizontally swinging frame, disks carried thereby, and adjustable legs adapted to engage the tin-pot.

6. In apparatus for the manufacture of tin or like coated plates, the combination with the tin-pot and rolls, of a horizontally swinging frame, disks carried thereby, and adjustable legs having crotches adapted to engage the edges of the tin-pot.

7. In apparatus for the manufacture of tin or like coated plates, the combination with the tin-pot and rolls, of a horizontally swinging frame, rotary disks carried thereby, downwardly projecting bars on said frame, legs having slots, a bolt passing through said slots and connecting said legs to said bars, the lower end of said leg being crotched to engage the edge of the tin-pot.

8. In apparatus for handling plates in the manufacture of tin or like coated plates, the combination of rotary shafts, and solid disks arranged at intervals thereon.

9. In apparatus for handling plates in the manufacture of tin or like coated plates, the combination of rotary shafts, and yieldingly mounted solid disks arranged at intervals thereon.

10. In apparatus for handling plates in the manufacture of tin or like coated plates, the combination of yieldingly mounted bearing-boxes, shafts journaled therein, and solid disks arranged at intervals thereon.

11. In apparatus for handling plates in the manufacture of tin or like coated plates, the combination of spring actuated bearing-boxes movable in guides, shafts journaled in said bearing-boxes, and solid disks arranged at intervals thereon.

12. In apparatus for handling plates in the manufacture of tin or like coated plates, the combination of bearing-boxes movable in guides, springs interposed between said bearing-boxes and an abutment, shafts journaled in said bearing-boxes, and solid disks arranged at intervals thereon.

13. In apparatus for handling plates in the manufacture of tin or like coated plates, the combination of bearing-boxes mounted in guides, one set of bearing-boxes being fixed, and the other movable in said guides and spring actuated, shafts journaled in said boxes, and solid disks arranged at intervals thereon.

14. In apparatus for the manufacture of tin or like coated plates, the combination with the tin-pot, and means for drawing the tin plate therefrom, of an inclined support, and means for shifting the plate to a different position from that at which it emerges from said tin-pot.

15. In apparatus for the manufacture of tin or like coated plates, the combination with the tin-pot, means for drawing the tin plate therefrom, of an inclined support, and a shifting device in the path of the plate as it descends the incline to shift its position from that at which it emerges from the tin-pot.

16. In apparatus for the manufacture of tin or like coated plates, the combination with the tin-pot, means for drawing the tin plate therefrom, of an inclined support, and a shifting device in the path of the plate adapted to engage the plate adjacent to the corner thereof.

17. In apparatus for the manufacture of tin or like coated plates, the combination with the tin-pot, means for drawing the tin plate therefrom, of an inclined support, and a yielding shifting arm in the path of the plate as it descends said incline.

In testimony whereof, we, the said SAVENIOUS C. STINER and ROBERT H. KEHRING, have hereunto set our hands.

SAVENIOUS C. STINER.
ROBERT H. KEHRING.

Witnesses:
  A. H. FREEMAN,
  C. B. PARKER.